United States Patent
Lee

(10) Patent No.: US 9,739,874 B2
(45) Date of Patent: Aug. 22, 2017

(54) APPARATUS FOR DETECTING DISTANCES IN TWO DIRECTIONS

(71) Applicant: HITACHI-LG DATA STORAGE KOREA, INC., Seoul (KR)

(72) Inventor: Euncheol Lee, Seoul (KR)

(73) Assignee: HITACHI-LG DATA STORAGE KOREA, INC., Seoul (KR)

(*) Notice: Subject to any disclaimer, the term of this patent is extended or adjusted under 35 U.S.C. 154(b) by 351 days.

(21) Appl. No.: 14/706,562

(22) Filed: May 7, 2015

(65) Prior Publication Data
US 2015/0323669 A1 Nov. 12, 2015

(30) Foreign Application Priority Data

May 8, 2014 (KR) .................. 10-2014-0055082

(51) Int. Cl.
| | |
|---|---|
| *G01C 3/08* | (2006.01) |
| *G01S 7/481* | (2006.01) |
| *G01S 17/02* | (2006.01) |
| *G01S 17/08* | (2006.01) |

(52) U.S. Cl.
CPC ............ *G01S 7/481* (2013.01); *G01C 3/08* (2013.01); *G01S 7/4813* (2013.01); *G01S 17/026* (2013.01); *G01S 17/08* (2013.01)

(58) Field of Classification Search
CPC ....................................... G01S 7/481
USPC ...................................... 356/3.11
See application file for complete search history.

(56) References Cited

U.S. PATENT DOCUMENTS

| 5,751,408 A * | 5/1998 | Ohtomo ............. G01C 15/004 356/5.14 |
|---|---|---|
| 9,127,935 B2 * | 9/2015 | Olexa ................. G01B 11/14 |
| 2005/0270496 A1 * | 12/2005 | Mochizuki ........... G03B 21/132 353/70 |
| 2006/0193521 A1 * | 8/2006 | England ................ G01S 7/51 382/190 |
| 2007/0081151 A1 * | 4/2007 | Shortt ................. G01N 21/47 356/237.2 |
| 2009/0033945 A1 * | 2/2009 | Meier .................. G01S 7/481 356/498 |
| 2011/0102805 A1 * | 5/2011 | Kuramoto .......... G01B 9/02007 356/493 |
| 2011/0310396 A1 * | 12/2011 | Tamiya ................ G01D 5/38 356/498 |

(Continued)

*Primary Examiner* — Jason Olson
(74) *Attorney, Agent, or Firm* — Birch, Stewart, Kolasch & Birch, LLP

(57) ABSTRACT

Provided is an apparatus for measuring distances in two directions. The apparatus in accordance with an embodiment of the present invention may include a sensor module configured to include a light emission unit configured to emit a first wavelength beam and a second wavelength beam, a light reception unit configured to receive reflected light emitted by the light emission unit and reflected from an object and first and second beam splitters respectively disposed ahead of the light emission unit and the light reception unit and configured to transmit the first wavelength beam and reflect the second wavelength beam; and a motor configured to rotate the sensor module. Accordingly, there is an advantage in that a production cost can be reduced because distance measurement and height measurement are performed using a single module.

7 Claims, 5 Drawing Sheets

(56) References Cited

U.S. PATENT DOCUMENTS

| | | | |
|---|---|---|---|
| 2012/0002164 A1* | 1/2012 | Yamamoto | A61B 3/102 |
| | | | 351/206 |
| 2013/0222785 A1* | 8/2013 | Sasaki | G01C 3/08 |
| | | | 356/4.09 |
| 2014/0071425 A1* | 3/2014 | Dunne | G01C 15/002 |
| | | | 356/4.01 |
| 2014/0168369 A1* | 6/2014 | Crane | H04N 13/0253 |
| | | | 348/46 |
| 2015/0355332 A1* | 12/2015 | Jeong | G01B 11/24 |
| | | | 345/419 |
| 2017/0074642 A1* | 3/2017 | Nishida | G01B 21/047 |

* cited by examiner

APPARATUS FOR DETECTING DISTANCES IN TWO DIRECTIONS

BACKGROUND OF THE INVENTION

Field of the Invention

The present invention relates to an apparatus for detecting distances in two directions and, more particularly, to an apparatus for simultaneously measuring a distance and height using a two-wavelength light source.

Related Art

A demand for housework help robots, such as robot cleaners, is increasing and the service robot market is growing due to an increase of an aged population, a strong wind of well-being, the avoidance of hard works. Such a service robot is based on autonomous traveling, and thus can recognize indoor element environment, write an indoor topographic map, detect an obstacle through some sensors, and move based on an autonomous determination.

In a conventional robot cleaner, for example, an ultrasonic sensor is used in order to measure a distance and a sensor adopting a position sensitive detector (PSD) is used in order to measure height separately from the distance sensor.

SUMMARY OF THE INVENTION

The present invention provides an apparatus capable of performing distance measurement and height measurement at the same time.

In an aspect, there is provided an apparatus for measuring distances in two directions, including a sensor module configured to include a light emission unit configured to emit a first wavelength beam and a second wavelength beam, a light reception unit configured to receive reflected light emitted by the light emission unit and reflected from an object and first and second beam splitters respectively disposed ahead of the light emission unit and the light reception unit and configured to transmit the first wavelength beam and reflect the second wavelength beam; and a motor configured to rotate the sensor module.

In an embodiment, the sensor module may measure a distance in a first direction and a distance in a second direction by alternately emitting the first wavelength beam and the second wavelength beam at a specific time interval.

In an embodiment, the sensor module may measure a distance from an object ahead through the first wavelength beam and measure height up to an object or ground below through the second wavelength beam.

In an embodiment, the light emission unit may include an emission light source configured to emit the first wavelength beam and the second wavelength beam and a collimator lens configured to convert a beam into parallel light.

In an embodiment, the light reception unit may include a telecentric lens configured to output beams incident at various angles in a specific size and shape, a bandpass filter configured to transmit the first wavelength beam and the second wavelength beam, and a sensor configured to detect a location on which the reflected light is focused.

In an embodiment, the apparatus may further include a cover configured to protect the sensor module.

In an embodiment, holders for fixing the first and the second beam splitters may be provided in the cover.

In an embodiment, the apparatus may be mounted on a system that operates while moving with wheels on a bottom.

Accordingly, there is an advantage in that a production cost can be reduced because distance measurement and height measurement are performed using a single module.

DESCRIPTION OF EXEMPLARY EMBODIMENTS

Hereinafter, an apparatus for measuring distances in two directions in accordance with an embodiment of the present invention is described in detail with reference to the accompanying drawings.

Sensors for measuring a distance may include an infrared sensor using infrared rays, an ultrasonic sensor using an ultrasonic wave, and a laser scanner sensor.

The infrared sensor can measure a distance using a position sensitive detector (PSD) capable of receiving access light of infrared rays that are emitted by a light source and reflected from a surface of the subject of measurement according to a triangulation measurement principle and calculating a light reception point using an output current.

The ultrasonic sensor can measure a distance from the subject of measurement by measuring the time that is taken for an ultrasonic wave pulse emitted by the ultrasonic sensor to return back to the ultrasonic sensor after being reflected from a surface of the subject of measurement.

The laser scanner sensor can measure a distance from a target by measuring the time that is taken for a short laser pulse of about a nano-second to return back to the laser scanner sensor at the velocity of light after being reflected from the target.

Figure 1:
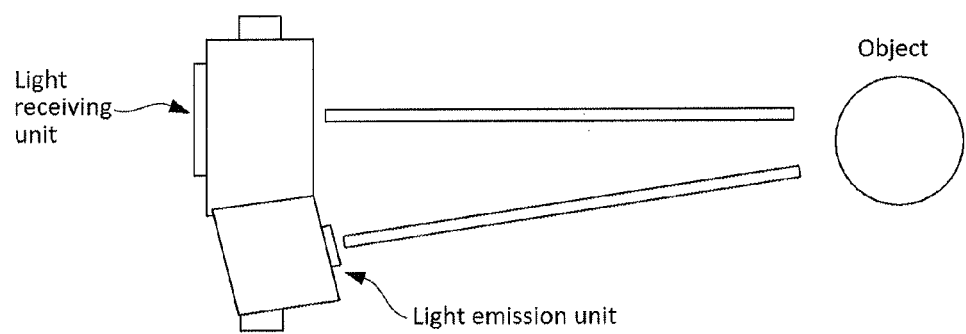
FIG. 1 is a plan view of a conventional distance measurement module.

FIG. 1 is a plan view of a conventional distance measurement module, and illustrates an infrared sensor module using a triangulation method.

The infrared sensor module may include a light emission unit for radiating infrared rays and a light reception unit for detecting reflected light reflected from a target object after infrared rays are emitted by the light emission unit. The light emission unit may include a laser diode for generating infrared rays out of a visible ray and a collimator lens for outputting a laser beam as parallel light. The light reception unit may include a telecentric lens for outputting beams incident at various angles in a specific size and shape, a bandpass filter for receiving a wavelength band of a laser beam output by a laser diode, and a CMOS sensor for detecting a distance.

The location of the CMOS sensor on which reflected light is focused is different depending on the location of the subject of measurement. The CMOS sensor can measure a distance from the subject of measurement using a triangulation method by detecting the location on which the reflected light is focused.

For reference, an optical system whose primary beam of light is parallel to the optical axis of a lens is called a telecentric optical system. An optical system in which light incident from an object to a lens is parallel to an optical axis outside the optical axis is called an object-side telecentric optical system. An optical system in which light from a lens to the upper side is parallel to an optical axis outside the optical axis is called an upper telecentric optical system. An optical system having both the structures of the object-side telecentric optical system and the upper telecentric optical system is called a both-sided telecentric optical system.

Furthermore, an optical system in which a lens whose iris is placed at the focusing point of the lens is called a telecentric optical system. Since the iris is placed at the focusing point of the lens, the primary beam of light can be parallel to the object side, the upper side, or the both sides with respect to the optical axis of the lens. In particular, if the object side is telecentric, an error in measurement is not generated because there is no change in the dimensions and location although a subject for photography moves up and down.

Accordingly, the telecentric lens can reduce or remove problems, such as that magnification is changed or an image is distorted due to a change in the location of an object, a perspective error is generated, and the edge location of an object is unclear due to the setting of a light position, and may be dominant in image processing and measurement with high precision.

The measurement module of FIG. 1 can perform only a distance measurement function.

Figure 2:
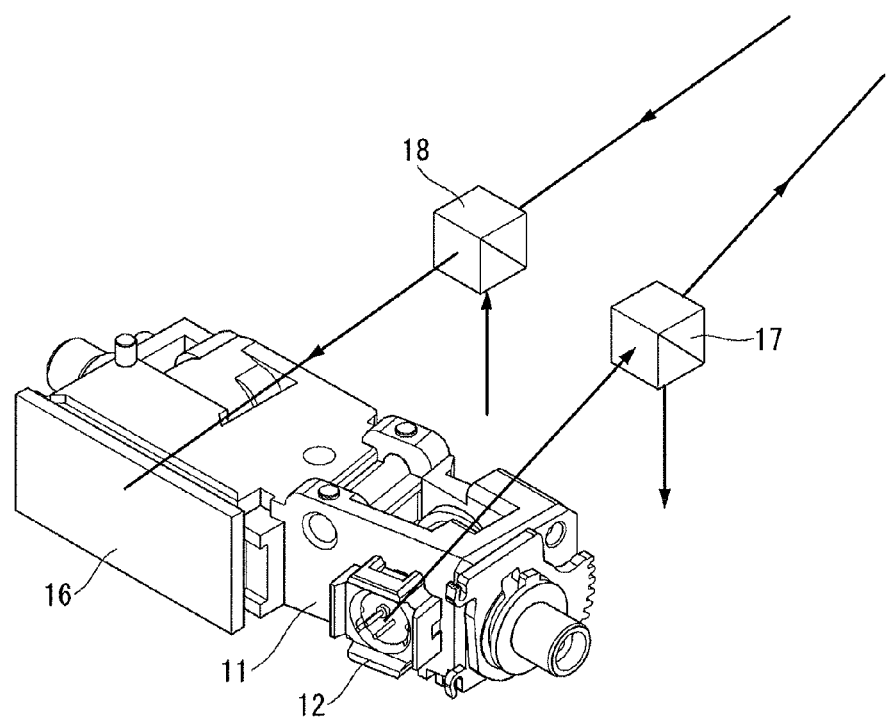
FIG. 2 illustrates the elements of a sensor module for measuring both a distance and height.

FIG. 2 illustrates the elements of a sensor module for measuring both a distance and height.

In an embodiment of the present invention, as illustrated in FIG. 2, the sensor module includes a light emission unit configured to emit a laser beam of an infrared band having two wavelengths not a single wavelength and beam splitters configured to differently change the paths of laser beams having different wavelengths so that a distance and height can be measured using the single module.

The sensor module of FIG. 2 differs from the distance measurement module of FIG. 1 in the laser diode of the light emission unit and in that the beam splitters are disposed ahead of the light emission unit and the light reception unit.

The two-wavelength laser diode of the light emission unit can selectively emit a first wavelength beam and a second wavelength beam. The beam splitters disposed ahead of the light emission unit and the light reception unit may measure a distance through a first wavelength beam and measure height through a second wavelength beam by transmitting the first wavelength beam and reflecting the second wavelength beam, for example.

For distance measurement, the beam splitter disposed ahead of the light emission unit changes the direction in which a second wavelength beam emitted by the light emission unit travels in a direction perpendicular to a plane that is formed by a track on which a first wavelength beam incident on the light reception unit after being emitted by the light emission unit and passing through the two beam splitters travels. The beam splitter disposed ahead of the light reception unit changes the direction in which a second wavelength beam incident in a direction perpendicular to a plane formed by a track on which a first wavelength beam travels after being reflected from the ground or an object travels.

Figure 3:
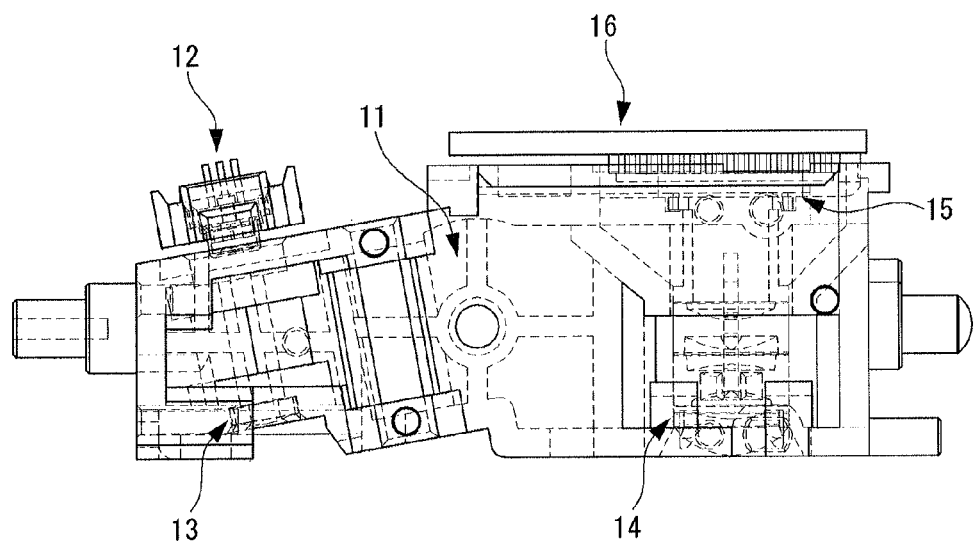
FIG. 3 illustrates the state in which elements for light emission and light reception in the sensor module of FIG. 2 have been coupled to a sensor base.

FIG. 3 illustrates the state in which elements for light emission and light reception in the sensor module of FIG. 2 have been coupled to a sensor base.

The light emission unit and light reception unit of the sensor module 10 are mounted on the base 11. The light emission unit may be configured to include an emission light source 12, such as laser diode for emitting laser beams of infrared rays having two wavelengths, and a collimator lens 13 configured to convert a laser beam into parallel light. The light reception unit may be configured to include a telecentric lens 14 configured to output beams incident at various angles in a specific size and shape, a bandpass filter 15 configured to receive the wavelength band of a laser beam output by the emission light source 12, and a light reception sensor 16 configured to receive light reflected from an object and detect the location of the reflected light.

Since the emission light source 12 emits beams of two wavelengths, the bandpass filter 15 can be designed and fabricated to have a wide transmission wavelength than a filter used in the distance measurement module using only a single wavelength.

Figure 4:
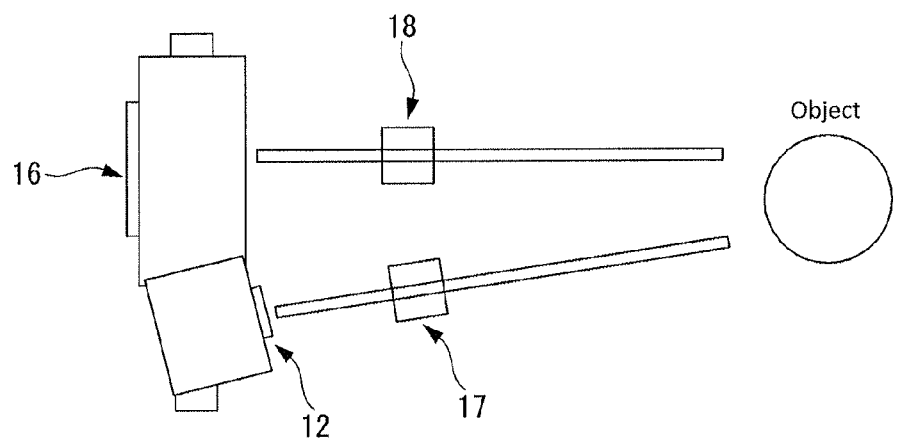
FIG. 4 is a plan view of the sensor module for measuring a distance through a first wavelength beam.

FIG. 4 is a plan view of the sensor module for measuring a distance through a first wavelength beam.

In the sensor module 10 of FIG. 4, a first beam splitter 17 is disposed ahead of the light emission unit, and a second beam splitter 18 is disposed ahead of the light reception unit. The first and the second beam splitters 17, 18 transmit a first wavelength beam and change the path of a second wavelength beam by reflecting the second wavelength beam.

In the sensor module 10 of FIG. 4, in order to measure a distance from an object, the emission light source 12 emits a first wavelength beam transmitted by the first and the second beam splitters 17, 18. The beam emitted by the emission light source 12 passes through the first beam splitter 17, and is reflected from the subject of measurement. The reflected light passes through the second beam splitter 18, and is focused on the light reception sensor 16.

According to the triangulation method, if the subject of measurement is close to the sensor module 10, reflected light reflected from the subject of measurement is focused on a location that belongs to the light reception sensor 16 and that is distant from the emission light source 12. If the subject of measurement is distant from the sensor module 10, reflected light reflected from the subject of measurement is focused on a location that belongs to the light reception sensor 16 and that is close to the emission light source 12. Accordingly, a distance from the subject of measurement can be measured.

Figure 5:
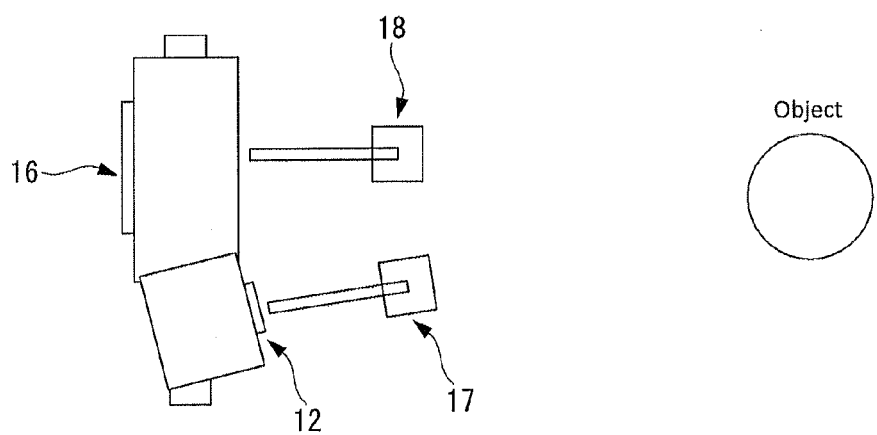
FIGS. 5 and 6 are a plan view and side view of the sensor module for measuring height through a second wavelength beam.
Figure 6:
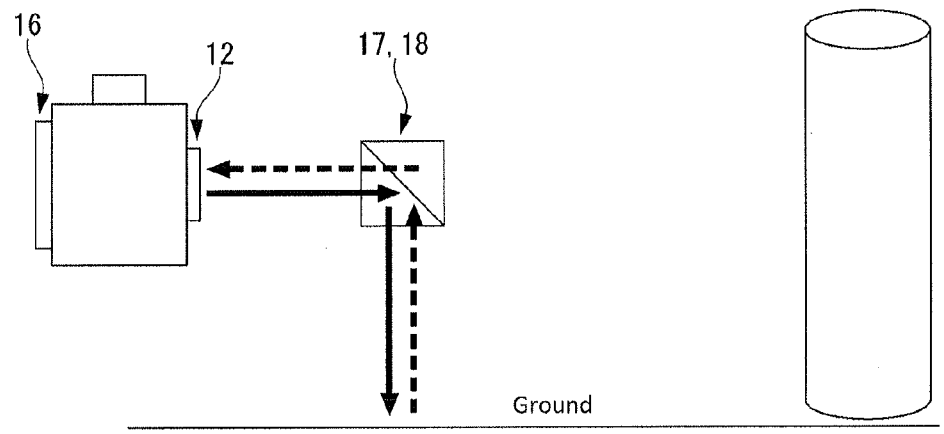

FIGS. 5 and 6 are a plan view and side view of the sensor module for measuring height through a second wavelength beam.

In the sensor module 10 of FIGS. 5 and 6, in order to measure a distance from an object, the emission light source 12 emits a second wavelength beam reflected by the first and the second beam splitters 17, 18. The beam emitted by the emission light source 12 is reflected by the first beam splitter 17, travels toward the bottom or ground, and is reflected from the bottom or the subject of measurement. The reflected light is reflected from the second beam splitter 18 and then focused on the light reception sensor 16.

As in distance measurement, if the bottom or the subject of measurement is close to the sensor module 10, reflected light reflected from the bottom or the subject of measurement is focused on a location that belongs to the light reception sensor 16 and that is distant from the emission light source 12. If the bottom or the subject of measurement is distant from the sensor module 10, reflected light reflected from the bottom or the subject of measurement is focused on a location that belongs to the light reception sensor 16 and that is close to the emission light source 12. Accordingly, height up to the bottom or the subject of measurement can be measured.

As described above, a distance and height can be measured using a single sensor module because the emission light source 12 selectively emits light and the first and the second beam splitters 17, 18 selectively change the path of a beam.

The operation of the emission light source 12 may be controlled using a microprocessor. Distance measurement and height measurement can be alternately repeated by changing the wavelength of light emitted by the emission light source 12 in a time division way.

If the sensor module in accordance with an embodiment of the present invention is applied to a robot cleaner or a moving body robot, in particular, if the sensor module is driven in a rotational manner, it can detect surround obstacles. Furthermore, a cliff portion on the ground can be detected by the single sensor module.

Figure 7:
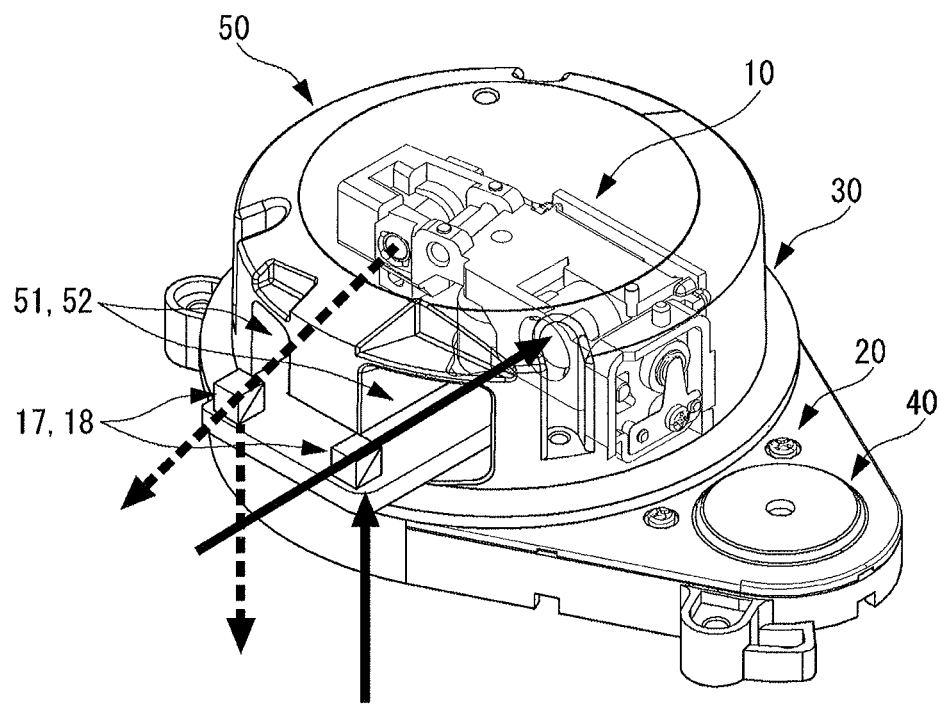
FIG. 7 is a perspective view of a measurement apparatus adopted in the sensor module of FIG. 2 and configured to measure a distance and height while rotating.
Figure 8:
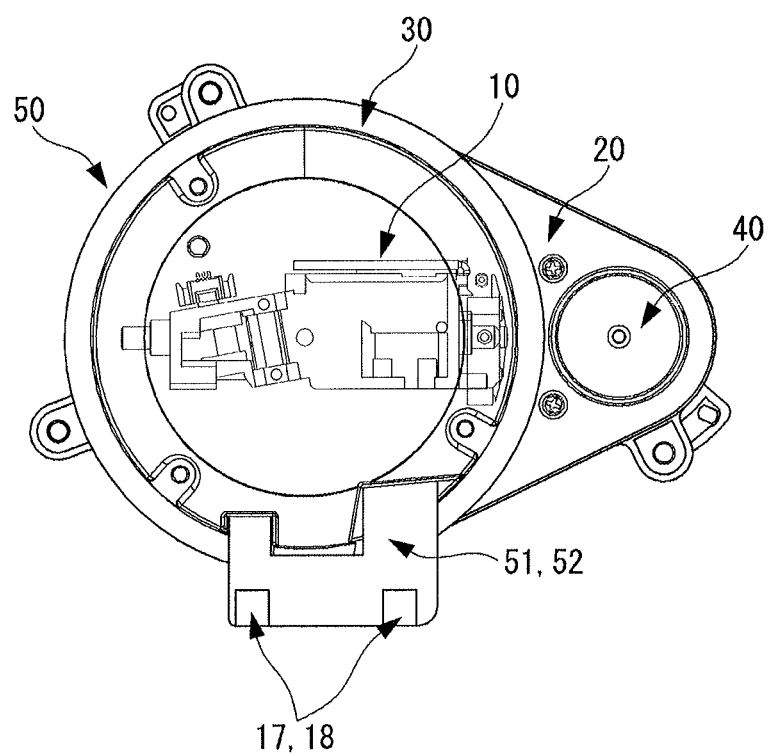
FIG. 8 is a plan view of the measurement apparatus in accordance with an embodiment of the present invention.

FIG. 7 is a perspective view of a measurement apparatus adopted in the sensor module of FIG. 2 and configured to measure a distance and height while rotating, and FIG. 8 is a plan view of the measurement apparatus in accordance with an embodiment of the present invention.

The body 20 of the measurement apparatus 100 of FIGS. 7 and 8 may be configured to include a rotation unit configured to have the sensor module 10 of FIG. 2 mounted thereon and to be rotatable, a motor 40 configured to rotate the rotation unit 30, and a cover 50 configured to cover the rotation unit 30.

The rotation unit 30 is connected to the motor 40 through a belt or gear, and may rotate 360 degrees or in a range of an angle smaller than 360 degrees. The rotation unit 30 may measure a distance in the entire range of 360 degrees or may measure a distance in a range of an angle smaller than 360 degrees, for example, in a range of 180 degrees.

The motor 40, such as a step motor or DC motor without being limited thereto, may include an encoder and recognize an angle in which the rotation unit 30 is rotated. Furthermore, in FIG. 7, the motor 40 has been illustrated as being configured separately from the rotation unit 30 and as driving the rotation unit 30 through the belt or gear, but is not limited thereto. For example, the motor 40 may be disposed under the rotation unit 30, and may directly drive the rotation of the rotation unit 30 without a belt or gear.

The cover 50 is mounted on top of the rotation unit 30, and protects the sensor module 10 from an external impact or dust. If the cover 50 is rotated along with the rotation unit 30, first and second B/S holders 51, 52 may be provided in the cover 50 in order to fix the first beam splitter 17 and the second beam splitter 18. If the cover 50 is separated from the rotation unit 30 and not rotated along with the rotation unit 30, the first and the second B/S holders 51, 52 may be provided in the rotation unit 30 in order to fix the first beam splitter 17 and the second beam splitter 18.

The first and the second B/S holders 51, 52 are open downward and forward and/or backward (i.e., windows are formed in the first and the second B/S holders 51, 52). Accordingly, a first wavelength beam for distance measurement and a second wavelength beam for height measurement can pass through the cover 50 without coming in contact with the cover 50 after passing through the first beam splitter 17 and the second beam splitter 18 or being reflected from them.

If the first beam splitter 17 and the second beam splitter 18 are disposed within the rotation unit 30, holes may be formed at the bottom of the rotation unit 30 so that a second wavelength beam for height measurement and reflected light can pass through the holes. Alternatively, the first beam splitter 17 and the second beam splitter 18 may be disposed to be outward protruded. More specifically, the first beam splitter 17 and the second beam splitter 18 may be disposed so that the second wavelength beam is reflected from the outside of the rotation unit 30 to the bottom through the first and the second beam splitters 17, 18.

The measurement apparatus 100 of FIGS. 7 and 8 may be disposed at a partially protruded front part of a robot cleaner which operates while moving on the bottom. Accordingly, the measurement apparatus 100 can detect an obstacle by measuring a distance from an object within a range of 360 degrees while rotating 360 degrees or at an angle smaller than 360 degrees. Furthermore, the measurement apparatus 100 can detect a cliff part by measuring height up to the bottom at an angle less than 360 degrees.

The measurement apparatus 100 of FIGS. 7 and 8 may include a process configured to control the light emission of the emission light source 12 of the rotation unit 30 and the rotation of the motor 40 and to calculate a distance or height based on a signal received from the light reception sensor 16. The processor can control the driving of the emission light source 12 in a time division way while rotating the rotation unit 30 at a specific angular velocity by controlling the motor 40, thereby being capable of repeating distance measurement and height measurement.

For example, the processor may rotate the rotation unit 30 once for a specific time, for example, at an interval of 2 seconds by controlling the motor 40, may emit a first wavelength beam for a specific time, for example, for $\frac{1}{48}$ second by controlling the emission light source 12, may repeat an operation for emitting a second wavelength beam for $\frac{1}{48}$ second, and may calculate a distance and height at an interval of an angle of a 7.5 degree based on a signal received by the light reception sensor 16.

The motor 40 does not consecutively rotate the rotation unit 30 and may perform an operation of rotating the rotation unit 30, for example, at an interval of an angle of a 7.5 degree and then stopping the rotation unit 30 at an interval of $\frac{1}{24}$ second.

An apparatus on which the measurement apparatus 100 is mounted, for example, a robot cleaner may measure a distance from an object or height up to the bottom or ground, which is detected by the measurement apparatus 100, while moving using wheels included in the apparatus, may generate a map for obstacles, and may perform an autonomous traveling operation along a safe area based on the map.

Furthermore, if the measurement apparatus 100 is mounted on an arm of a robot having the degree of freedom of multi-axis, distances (or height) in two directions can be measured using a single measurement sensor module. Accordingly, an obstacle ahead of the arm can be detected using a small number of sensor modules.

The measurement apparatus 100 in accordance with an embodiment of the present invention has been illustrated as measuring a distance and height, but may measure distances in two difference directions not a simple distance and height.

The exemplary embodiments of the present invention have been disclosed for illustrative purposes, and those skilled in the art may improve, change, replace, or add various other embodiments within the technical spirit and scope of the present invention disclosed in the attached claims.

What is claimed is:

1. An apparatus for measuring distances in two directions, comprising:
    a sensor module configured to comprise a light emission unit configured to emit a first wavelength beam and a second wavelength beam, a light reception unit configured to receive reflected light emitted by the light emission unit and reflected from an object and first and second beam splitters respectively disposed ahead of the light emission unit and the light reception unit and configured to transmit the first wavelength beam and reflect the second wavelength beam; and
    a motor configured to rotate the sensor module,
    wherein the sensor module measures a distance in a first direction and a distance in a second direction by alternately emitting the first wavelength beam and the second wavelength beam at a specific time interval.

2. The apparatus of claim 1, wherein the sensor module measures a distance from an object ahead through the first wavelength beam and measures height up to an object or ground below through the second wavelength beam.

3. The apparatus of claim 1, wherein the light emission unit comprises:
    an emission light source configured to emit the first wavelength beam and the second wavelength beam, and
    a collimator lens configured to convert a beam into parallel light.

4. The apparatus of claim 1, wherein the light reception unit comprises:
    a telecentric lens configured to output beams incident at various angles in a specific size and shape,
    a bandpass filter configured to transmit the first wavelength beam and the second wavelength beam, and
    a sensor configured to detect a location on which the reflected light is focused.

5. The apparatus of claim 1, further comprising a cover configured to protect the sensor module.

6. The apparatus of claim 5, wherein holders for fixing the first and the second beam splitters are provided in the cover.

7. The apparatus of claim 1, wherein the apparatus is mounted on a system that operates while moving with wheels on a bottom.

* * * * *